May 9, 1967 G. V. MOMMSEN 3,318,641

METERING MEANS

Filed Feb. 26, 1965 3 Sheets-Sheet 1

INVENTOR.
GORDON V. MOMMSEN
BY Moore, White & Burd
ATTORNEYS

INVENTOR.
GORDON V. MOMMSEN
BY Moore, White & Burd
ATTORNEYS

INVENTOR.
GORDON V. MOMMSEN
BY Moore, White & Burd
ATTORNEYS

United States Patent Office 3,318,641

Patented May 9, 1967

1

3,318,641
METERING MEANS

Gordon V. Mommsen, Minneapolis, Minn., assignor to Possis Machine Corporation, Minneapolis, Minn., a corporation of Minnesota Filed Feb. 26, 1965, Ser. No. 435,430
10 Claims. (Cl. 302—49)

This invention relates to an apparatus and method for transporting metered amounts of fluid material such as liquids, aerosols, or powdered solids. More particularly, the invention relates to an apparatus for continuously metering quantities of fluidized finely divided solids into moving air streams for transportation to a discharge location.

Numerous devices have been developed for transporting powdered material with the use of moving air. These prior devices have not been entirely satisfactory as they are designed for particular types of discharge nozzles and in operation do not deliver a uniform concentration of powdered material at the discharge outlet of the device. These prior feeding and metering devices are equipped with a hopper for receiving powdered or granular material and with metering or pumping structures for transferring the material into a stream of moving air. The air is used to carry the powdered material to a discharge nozzle. In these devices the flow of powdered material from the hopper into the pumping structures is uneven and irregular as the powdered material tends to bridge in the hopper or clog the discharge opening between the hopper and the pumping structure.

It is the object of this invention to avoid the disadvantages of the prior metering and feeding devices by providing an improved apparatus and method for feeding and metering fluid material at a controlled and predetermined rate into moving air for transportation to material discharge means.

Another object of the invention is to provide a fluid material feeding apparatus with means for varying the amount of material metered into a moving carrier fluid independently of the pressure of the carrier fluid.

Another object of the invention is to provide a finely divided particulate material feeding apparatus which is usable with different types of nozzle designs.

Another object of the invention is to provide a fluid material feeding apparatus which is capable of discharging an even flow of fluid material to a plurality of discharge nozzles.

A further object of the invention is to provide a metering device operable to positively and simultaneously place controlled quantities of fluid material into a plurality of moving air streams.

Yet another object of the invention is to provide a metering device with adjustment means for controlling the rate of flow of fluid material into a moving stream of air and thereby regulate the concentration of the material carried by the moving air stream.

Other objects of the invention will become apparent as the description proceeds.

To the accomplishment of the foregoing and related ends, this invention comprises the features hereinafter fully described and particularly pointed out in the claims. The following description sets forth in detail a particular illustrative embodiment of the invention, this being indicative, however, of but one of the various ways in which the principles of the invention may be employed.

The invention is illustrated by the accompanying drawings in which the same numerals refer to corresponding parts and in which:

FIGURE 1 is a front elevational view of the feeding and metering apparatus of this invention with the metering unit shown in section;

2

Figure 1:
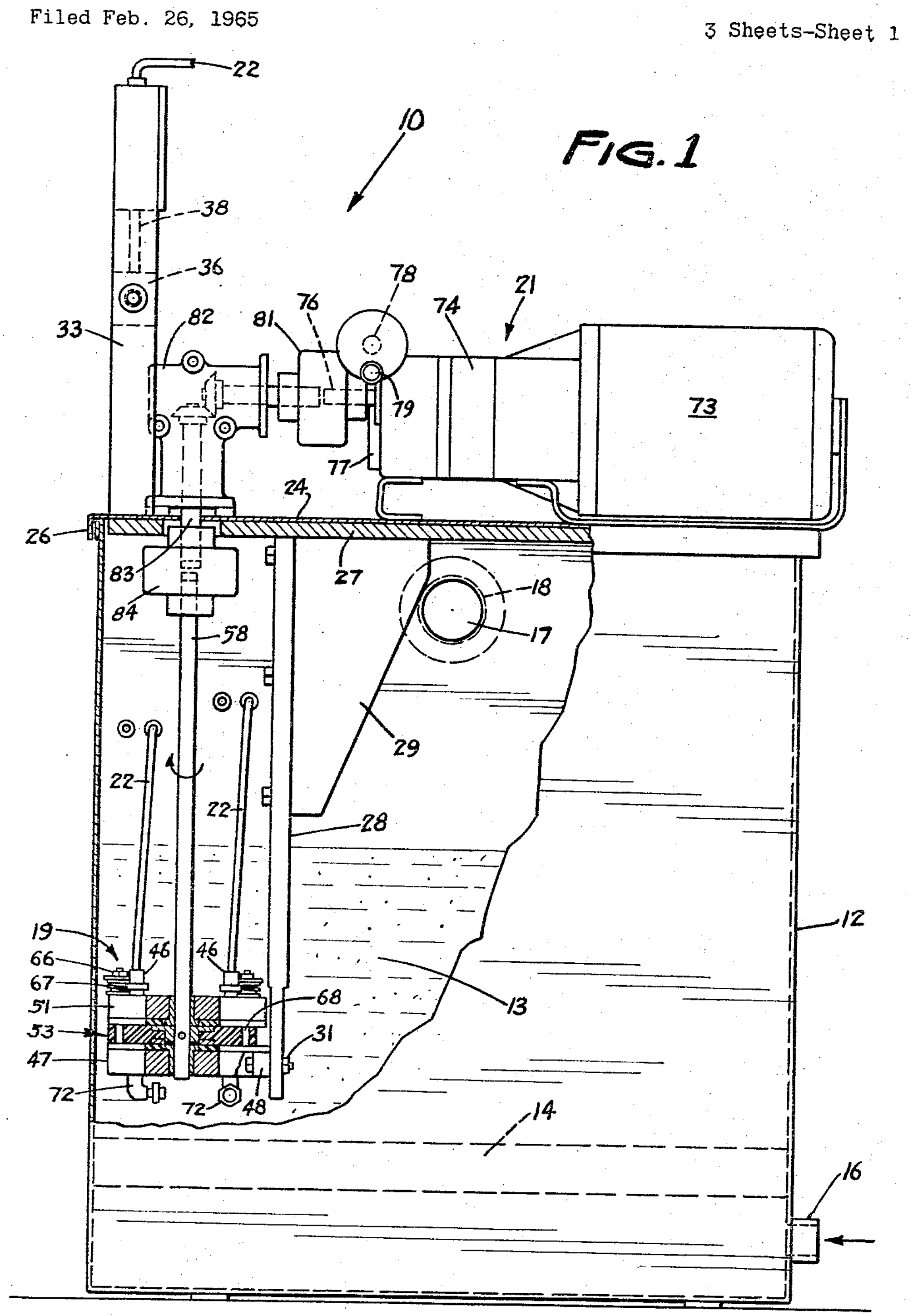
Figure 2:
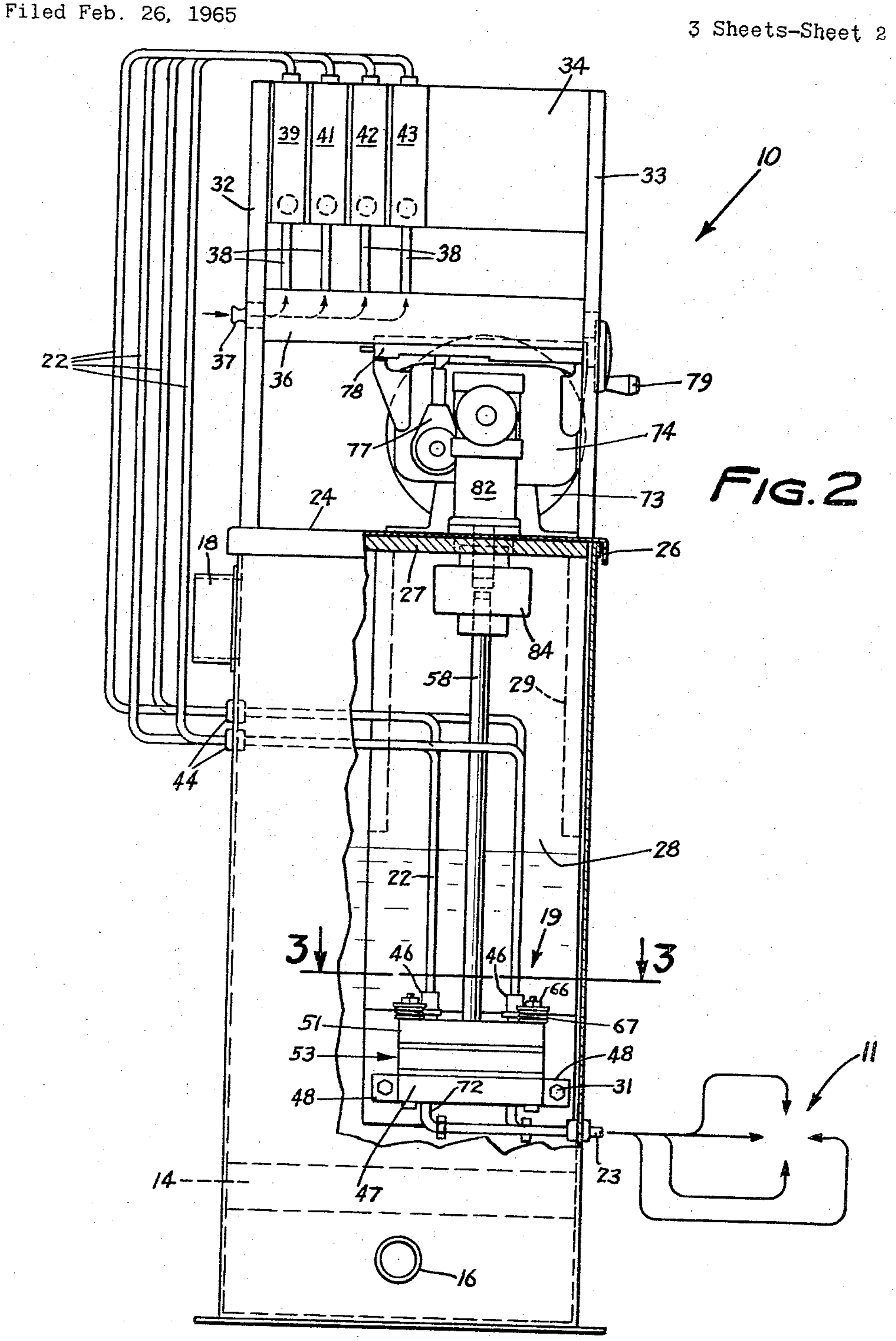
FIGURE 2 is a side elevational view of the apparatus of FIGURE 1 with part of the tank broken away to show the metering unit.

Referring to the drawings there is shown in FIGURES 1 and 2 the feeding and metering apparatus of this invention indicated generally with the number 10. This apparatus functions to discharge continuous and uniform concentrations of fluid material which may include liquids, aerosols and particulate or powdered solids. To illustrate one use of the apparatus 10 the fluid material is a finely divided epoxy resin which is discharged to a plurality of nozzle members indicated generally at 11. The resin is dispensed by the nozzle members 11 onto heated surfaces to coat and insulate the surfaces with the particulate resin.

The apparatus 10 supplies the nozzle members 11 with continuous flow and metered concentration of the fluid material carried in separate streams of air. The pressure of this carrier air may be varied independently of the metering operation of the apparatus 10. This permits the use of a wide variety of nozzle members. For example, the nozzle members 11 may be of the Venturi type, V-tube type, straight tube type, as well as other conventional types of nozzle design adapted to receive and discharge a uniform supply of air and particulate material.

The feeding and metering apparatus 10 comprises a tank 12 for storing a supply of fluid material 13 such as a finely divided epoxy resin, dry plaster, cement, and similar powdered material. The fluid material 13 is a finely divided solid suspended in air above a horizontal ceramic filter 14 having a plurality of very small vertical holes. A continuous supply of air is supplied to the bottom of the tank 12 through an air inlet 16. This air uniformly moves through the holes in the filter 14 causing the material 13 to float or be carried by the air so that it is similar to a colloidal suspension of particulate material. The air flows upwardly through the tank chamber and is discharged to the atmosphere through an outlet passage 17 formed by a tubular member 18 secured to the top section of the side wall of the tank 12.

The fluid material 13 in the tank 12 is discharged as continuous streams of particulate material suspended in air to the nozzle members 11 by a metering unit 19 operated by a drive means 21. The metering unit 19 receives a supply of air under pressure through inlet tubular members 22 as pipes or hoses. In operation the metering unit 19 mixes predetermined amounts of the suspended particulate material into the air received through the inlet tubular members 22 and discharges this air along with metered amounts of particulate material into outlet tubular members 23 connected to the nozzle members 11.

The top of the tank 12 is closed with a cover 24 having a downwardly projected peripheral flange 26 extended around the outside of the top of the tank. A horizontal plate 27 secured to the lower side of the cover 24 projects into the tank. A plate or support member 28 extended substantially parallel to one wall of the tank projects downwardly from the horizontal plate 27 and is secured thereto by a pair of gusset members 29. As seen in FIGURES 1 and 2, the plate 28 extends substantially normal to one side wall and parallel to the adjacent end wall of the tank 12. The metering unit 19 is secured to the lower portion of the plate 28 by nut and bolt assemblies 31.

A pair of arms 32 and 33 are secured to opposite corners of the horizontal plate 27 and project upwardly therefrom. The top section of the arms 32 and 33 are attached to opposite ends of a cross plate 34. The arms 32 and 33 and the plate 34 form frame structure for a manifold 36 extended horizontally between the arms 32 and 33. The manifold 36 has an inlet nipple 37 for accommodating a releasable coupling connected to a source of air pressure.

A plurality of outlet tubular members 38 couple the manifold 36 with pressure regulator or flow control valves 39, 41, 42 and 43, respectively. Each flow control valve is connected to one of the tubular members 22 used to transport air to the metering unit 19. The flow control valves function to permit the separate regulation of the flow of air into each tubular member 22. Additional flow control valves and tubular members 38 may be carried on the cross plate 34 in accordance with the air supply requirements of the metering unit 19.

As shown in FIGURE 2, the tubular members 22 extend into the tank 12 and project through grommets 44 attached to the side wall of the tank. Connectors 46 couple the ends of the tubular members 22 to the top of the metering unit 19.

Figure 3:
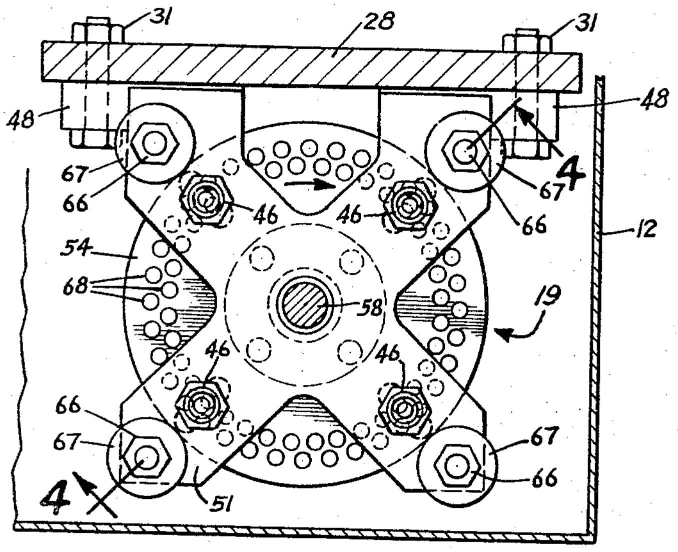
FIGURE 3 is an enlarged sectional view taken along the line 3—3 of FIGURE 2.
Figure 4:
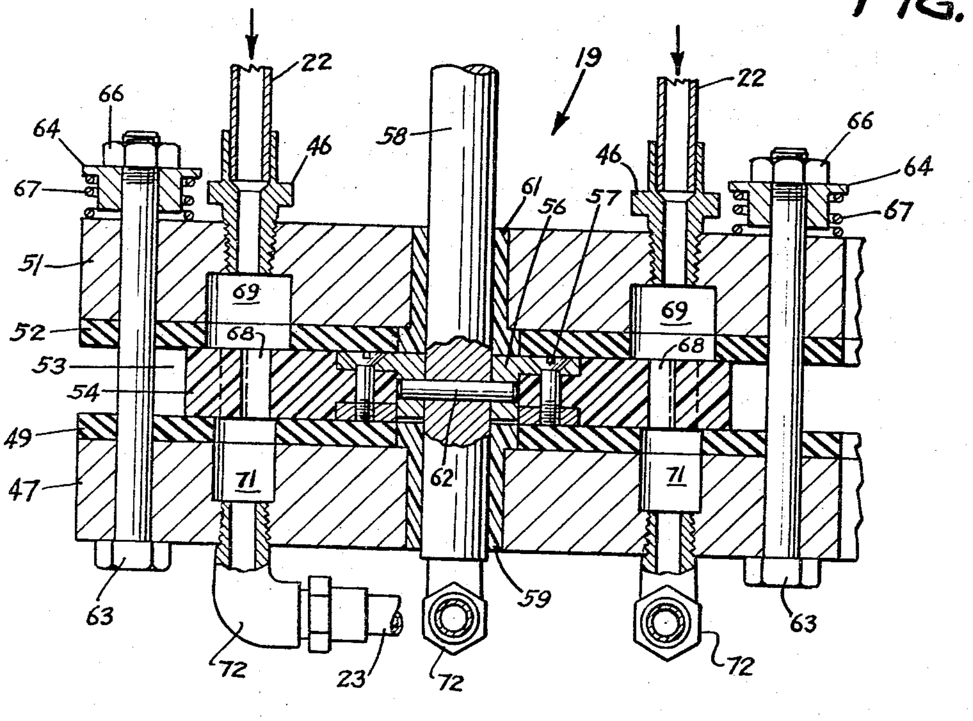
FIGURE 4 is an enlarged sectional view taken along the line 4—4 of FIGURE 3.

The metering unit 19 is shown in detail in FIGURES 3 and 4 and comprises a base plate 47 having lateral ears 48 receiving the nut and bolt assemblies 31 for the purpose of securing the plate to the bottom section of the support member 28. The base plate 47 has four equally spaced radial arms. A hard flat rubber member 49 is attached to the top flat surface of the plate 47 and functions as a seal and wear ring. A top plate 51 having four equally spaced radial arms, shown in FIGURE 3, is positioned horizontally over the radial arms of the bottom plate 47. The lower surface of the top plate 51 is flat and carries a flat hard rubber member 52 facing the rubber member 49. A rotor indicated generally at 53 is sandwiched between the bottom plate 47 and the top plate 51. The opposite sides of the rotor 53 are in surface engagement with the flat hard rubber members 49 and 52, respectively. The rotor 53 comprises a disc 54 of plastic material such as Teflon attached to a metal hub 56 by bolts 57.

The metal hub 56 is positioned about a vertical drive shaft 58 rotatably mounted in upright sleeve bearings 59 and 61 carried by the plates 47 and 51, respectively. A transverse pin 62 drivably couples the hub 56 to the drive shaft 58 so that on rotation of the drive shaft 58 the rotor 53 rotates between and relative to the plates 47 and 51.

The top plate 51 is attached to and guided on the bottom plate 47 by four upright bolts 63 which slidably project through the outer end sections of the arms of the top plate. Each bolt 63 carries a washer 64 held on the upper end of the bolt by a nut 66. A spring 67 is positioned between the washer 64 and the top of the plate 51 and biases the plate 51 in a downward direction toward the bottom plate 47. The four springs 67 establish a uniform biasing force on the top plate 51 and thereby uniformly clamp the disc 54 between the hard rubber members 49 and 52.

Figure 5:
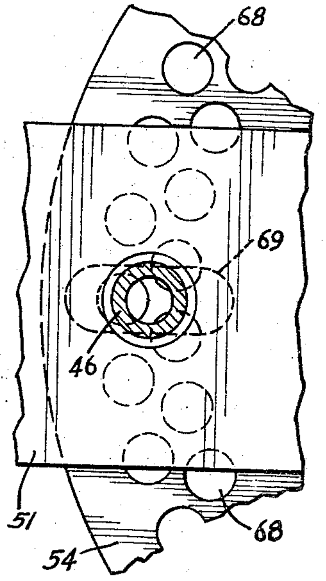
FIGURE 5 is an enlarged fragmentary plan view of the metering unit of FIGURE 3.

As shown in FIGURES 3 and 5, the disc 54 has two concentric rings of holes 68. All of the holes 68 have identical diameters and extend axially through the disc. The holes are equally spaced from each other and function as cavities to carry substantially identical amounts of fluid material upon rotation of the disc 54. The bottom surface of each of the arms of the top plate 51 has an elongated radial groove 69. As shown in FIGURE 5, the groove 69 extends across the two concentric rings of holes 68 and has a width which is greater than the diameter of one of the holes. The connectors 46 for the inlet air tubular members 22 are threaded into the top plate 51 and open into the grooves 69 whereby the air in the tubular members 22 flows into the grooves 69 and through the holes 68 aligned with the grooves 69 into bores 71 extended through the bottom plate 47. As seen in FIGURE 3, the bores 71 are in alignment with the grooves 69. Elbow couplings 72 project into the lower ends of the bores 71 and are threaded into the base plate 47. The elbow couplings 72 are connected to the outlet tubular members 23 which carry the mixture of air and particulate material to the nozzle members 11 as illustrated in FIGURE 2.

Referring to FIGURE 1, the drive means 21 for the shaft 58 comprises an electric motor 73 mounted on the top cover 24. The motor 73 is directly coupled to a speed reducer unit 74 having an output shaft 76. The speed reducer unit 74 has a speed adjustable drive to vary the speed of the output shaft 76. This is accomplished by moving a control arm 77 with an adjusting screw 78. The outer end of the adjusting screw 78 has an enlarged head carrying a handle 79 which is manually rotated to vary the speed of the output shaft 76.

A coupling 81 connects the output shaft 76 to a right angle power transmission unit 82 having a downwardly projected output shaft 83 connected to the top of the drive shaft 58 by a coupling 84. On operation of the motor 73 the drive shaft 58 is rotated and thereby rotating the rotor 53 of the metering unit 19. Thus, the speed of the rotor 53 may be varied by changing the speed of the output shaft 76 of the speed reducer unit 74.

In operation, tank 12 is provided with a supply of fluid material which is held in a suspended state by introducing air through the air inlet passage 16 below the ceramic filter 14. As the air passes through the filter 14 it continuously and uniformly mixes with the particulate material holding it in a suspended or fluidized state.

When air under pressure is connected to the inlet nipple 37 air flows into the manifold 36 which equalizes the air pressure supplied to the flow control valves 39 to 43. From the valves the air flows through the inlet tubular members 42 to the elongated radial grooves 69 in each of the arms of the top plate 51. Since the concentric circles of holes 68 in the disc 54 are in alignment with the radial grooves 69 the air flows through the holes 68 and into the bores 71 in the bottom plate 47. From the bores 71 the air flows through the elbow couplings 72 and into the discharge outlet tubular members 23 which lead to the nozzle members 11. The pressure of the air in the manifold 36 may be varied to alter and provide a high or low flow of air through the metering unit 19. Alternatively, the flow control valves 39 to 43 may be coupled to the tubular member 23 and the nozzle members connected to the tubular members 22. This reverses the flow of air through the metering unit 19.

The fluidized material 13 is metered simultaneously into each of the air streams which flow through the metering unit 19, by rotating the disc 54. This is accomplished by energizing the electric motor 73 and adjusting the speed of the output shaft 76 and thereby adjust the speed of rotation of the disc 54. An increase in the speed of rotation of the disc 54 produces an increase in the amount of material fed into the air streams. Thus, by adjusting the speed of the output shaft 76 the concentration of fluid material in the air streams can be varied. As shown in FIGURE 3, the substantial portion of the top of each of the four quadrants of the disc 54 is exposed to the fluidized material 13 such that the material may readily enter or fall into the holes 68.

In terms of method this invention contemplates the steps of suspending particulate material in a continuously upwardly moving body of air. This is accomplished by introducing air below the ceramic filter 14 which functions to discharge air at an even rate to the bottom area of the particulate material in tank 12. As the air moves upwardly through the material it is suspended similar to a colloidal suspension.

The suspended particulate material is continuously collected in limited amounts in holes 68 of the disc 54. This particulate material 13 freely flows into the holes 68 as they have top openings and bottom openings which are exposed to the particulate material in the arcuate areas between the aligned arms of the base plate 47 and the top plate 51.

As the disc 54 rotates particulate material 13 is continuously collected in the holes 68 and moved to a plurality of locations defined by the aligned arms of the base plate 47 and the top plate 51 for introduction into separate streams of air. The collected material is moved as a unit at a controlled rate of speed into the separate air streams. On rotation of the disc 54 the holes 68 are continuously moved under the grooves 69 whereby a controlled quantity of material is continuously fed and discharged into the air streams. The moving air carries the material to the discharge locations such as the nozzle members 11.

In summary, the feeding and metering apparatus 10 of this invention includes a metering unit 19 operable to positively displace particulate material 13 into a moving carrier fluid. This displacement is effected by a rotating disc 54 having a plurality of holes 68 for carrying powdered material into a stream of moving air. The amount of material moved into the air varies with the speed of rotation of the disc 54. This provides for the regulation of the density of particulate material carried by the moving air stream without changing the flow rate of the air. The flow of air through the metering device 19 is dependent upon the pressure of the air applied to the manifold 36 and can be regulated independently of the speed of rotation of the metering disc 54. Thus, the air pressure supplied to the nozzle members 11 may be varied independently of the rate that the particulate material is discharged into the moving air. This permits the apparatus to be used with nozzles which do not have Venturi restrictions and permits broader design latitude in the type of nozzles which can be used to dispense the fluid material.

It is apparent that many modifications and variations of this invention as hereinbefore set forth may be made without departing from the spirit and scope thereof. The specific embodiments described are given by way of example only and the invention is limited only by the terms of the appended claims.

I claim:

1. An apparatus for transporting metered amounts of fluid materials comprising in combination,
(a) tank means for storing a supply of fluid material,
(b) a top wall for closing the tank means,
(c) support means secured to the top wall and projected downwardly into the tank means,
(d) means in said tank means for suspending the material in a moving body of air,
(e) a metering unit positioned in the tank means below the top of the fluid material for conveying said fluid material from said tank means, said metering unit including
(1) a first member having a flat surface and at least one passage open to said surface,
(2) a second member having a flat surface and at least one passage open to said surface and in alignment with the passage in the first member,
(3) disc means positioned between the first member and the second member and engageable with the flat surfaces thereof, said disc means having a plurality of holes for collecting fluid material, said holes arranged in at least one circle that passes between the aligned passages in the first member and the second member,
(4) drive means for rotating said disc means relative to said first and second members,
(f) means securing one of the members of the metering unit to the lower portion of the support means,
(g) means supporting the drive means on the top wall,
(h) means for conducting a supply of air to the passage in said second member, and
(i) means for transporting the mixture of air and fluid material from the passages in the first member.

2. An apparatus for transporting metered amounts of fluid materials comprising in combination,
(a) tank means for storing a supply of fluid material said tank means having support means projected into the fluid material,
(b) a metering unit positioned in the tank means below the top of the fluid material for conveying said fluid material from said tank means, said metering including
(1) a first member having a plurality of circumferentially spaced radial arms, each arm having a flat surface and at least one passage open to said surface,
(2) a second member having a plurality of circumferentially spaced radial arms, each arm having a flat surface and at least one passage open to said surface and in alignment with the passages in the arms of the first member,
(3) guide means connecting the first member with the second member for holding the second member adjacent said first member with the flat surfaces facing each other,
(4) disc means positioned between the first member and the second member and engageable with the flat surfaces thereof, said disc means having a plurality of holes for collecting fluid material, said holes arranged in at least one circle that passes between the aligned passages in the first member and the second member,
(5) drive means mounted on said tank means for rotating said disc means relative to said first and second members,
(c) means securing the first member to said support means,
(d) means for conducting a supply of air to the passages in said arms of the second member, and
(e) means for transporting the mixture of air and fluid material from the passages in the arms of the first member.

3. The apparatus defined in claim 2 wherein said metering unit includes
(a) means for biasing the second member toward the first member thereby holding the disc means in sliding engagement with the flat surfaces of the arms of the first and second members 4. A metering unit for placing particulate material in a plurality of streams of moving air comprising
(a) a first stationary member having a plurality of circumferentially spaced radial arms, each arm having a flat surface and at least one passage open to said surface,
(b) a second member having a plurality of circumferentially spaced radial arms, each arm having a flat surface and at least one passage open to said surface and in alignment with the passage in the adjacent arm of the first member for receiving air under pressure,
(c) guide means connecting the first member with the second member for holding the second member adjacent said first member with the flat surfaces of the arms facing each other,
(d) disc means positioned between the first member and the second member and engageable with the flat surfaces thereof; said disc means having a plurality of holes for collecting the particulate material, said holes arranged in at least one circle that passes between the aligned passages in adjacent arms of the first member and the second member whereby air flows from the passages in the arms of the second member through holes in the disc means and into the passages in the arms of the first member,
(e) drive means for rotating said disc means relative to said first and second members whereby material collected in said holes is fed into the air moving through said passages.

5. The metering unit defined in claim 4 wherein said guide means includes
(a) means for biasing the second member toward the first member thereby holding the disc means in sliding engagement with the flat surfaces of the arms of the first and second members.

6. The metering unit defined in claim 4 wherein said drive means includes
(a) means for varying the speed of rotation of said disc means to change the amount of material introduced into the moving air in a given period of time.

7. The apparatus of claim 1 wherein said first member has a plurality of circumferentially spaced radial arms, each arm having a flat surface and at least one passage open to said flat surface and said second member has a plurality of circumferentially spaced radial arms, each arm having a flat surface and at least one passage open to said flat surface and in alignment with the passage in the adjacent arm of the first member, said flat surfaces engaging opposite sides of the disc means.

8. The apparatus defined in claim 1 wherein said metering unit includes means for biasing the second member toward the first member thereby holding the disc means in sliding engagement with the flat surfaces of the first and second members.

9. The metering unit defined in claim 2 wherein said drive means includes means for varying the speed of rotation of said disc means to change the amount of material introduced into the moving air in a given period of time.

10. The apparatus of claim 1 wherein said drive means includes means for varying the speed of rotation of said disc means to change the amount of material introduced into the moving air in a given period of time.

References Cited by the Examiner

UNITED STATES PATENTS

| | | | |
|---|---|---|---|
| 2,740,672 | 4/1956 | Morrow | 302—49 |
| 2,779,634 | 1/1957 | Atkinson et al. | 302—49 |
| 2,890,079 | 6/1959 | Stumpf | 302—49 |
| 3,203,738 | 8/1965 | Forsyth et al. | 302—49 |

ANDRES H. NIELSEN, *Primary Examiner*.